United States Patent [19]

Tsao et al.

[11] Patent Number: 5,754,147
[45] Date of Patent: May 19, 1998

US005754147A

[54] METHOD AND APPARATUS FOR DISPLAYING THREE-DIMENSIONAL VOLUMETRIC IMAGES

[76] Inventors: Che-Chih Tsao, 560 Memorial Dr., #1303, Cambridge, Mass. 02139; Zhen-Hong Zhou, 3102 Sands Pl., Bronx, N.Y. 10461; Albert K. Hu, 1602 Briarpoint Dr., San Jose, Calif. 95131

[21] Appl. No.: 548,382

[22] Filed: Oct. 26, 1995

Related U.S. Application Data

[63] Continuation of Ser. No. 108,331, Aug. 18, 1993, abandoned.

[51] Int. Cl.[6] .................................................. G09G 5/00
[52] U.S. Cl. ............................. 345/6; 345/139; 348/51; 359/462
[58] Field of Search ................... 345/6, 8–10, 139; 348/37, 42, 51, 46, 54; 359/462, 473, 478, 479, 466; 349/15; 463/32

[56] References Cited

U.S. PATENT DOCUMENTS

| | | | |
|---|---|---|---|
| 2,961,486 | 11/1960 | Marks | 178/6.5 |
| 3,140,415 | 7/1964 | Ketchpel | 313/146 |
| 3,204,238 | 8/1965 | Skellett | 343/7.9 |
| 3,447,854 | 6/1969 | Minter | 359/473 |
| 3,604,780 | 9/1971 | Martin | 350/96 B |
| 4,063,233 | 12/1977 | Rowe | 340/324 A |
| 4,100,571 | 7/1978 | Dykes et al. | 348/37 |
| 4,160,973 | 7/1979 | Berlin, Jr. | 340/718 |
| 4,294,523 | 10/1981 | Wolochuk et al. | 357/86 |
| 4,319,805 | 3/1982 | Nicolas | 350/120 |
| 4,670,744 | 6/1987 | Buzak | 345/6 |
| 4,871,231 | 10/1989 | Garcia, Jr. | 350/144 |
| 4,881,068 | 11/1989 | Korevaar et al. | 340/766 |
| 4,943,851 | 7/1990 | Lang et al. | 348/37 |
| 4,983,031 | 1/1991 | Solomon | 353/10 |
| 5,042,909 | 8/1991 | Garcia, Jr. et al. | 348/51 |
| 5,127,061 | 6/1992 | Amir et al. | 358/88 |
| 5,148,310 | 9/1992 | Batchko | 359/479 |
| 5,313,479 | 5/1994 | Florence | 372/26 |

OTHER PUBLICATIONS

Blundell et al, "Outline of a Low–Cost Prototype System to Display Three–Dimensional Images", IEEE Transactions on Instrumentation and Measurement, vol. 40, No. 4, Aug. 1991.
Faris, "True Stereo Display and Hard Copy from One System", Advanced Imaging, pp. 18–22, 80.
Guilfoyle, "A Third–Generation Digital Optical Computer", Photonics Spectra, May 1993, pp. 116–124.
Hornbeck, "Deformable–Mirror Spatial Light Modulators", SPIE Critical Reviews Series vol. 1150, pp. 86–102.
Jewell et al, "Microlasers", Scientific American, Nov. 1991, pp. 85–94.
D.L. MacFarlane, "Volumetric three–dimensional display", Nov. 1994, Applied Optics, pp. 7453–7457.
Solomon, "Volumetric Imaging launches Graphics into a 3–D World", Photonics Spectra, Jun. 1993.
Sullivan, "3–D Medical Video System on the Cutting Edge of Surgery", The Boston Herald, Mar. 31, p. 16.
Takeshita et al, "Framing Streak Camera", SPIE vol. 1539, Ultra high and High–Speed Photography, Videography, and Photonics '91, pp. 2–10.
The Way Things Work, Caves Books, Ltd., Oct. 1977, pp. 128, 129—"Image Converter Tube".
World News, pp. 30,32—"3–D Imaging—LED Panel Creates Interactive 3–D Computer Display".

*Primary Examiner*—Richard Hjerpe
*Assistant Examiner*—Lun-Yi Lao
*Attorney, Agent, or Firm*—Wolf, Greenfield & Sacks P.C.

[57] ABSTRACT

This invention relates generally to three dimensional volumetric display. Optical data is supplied by an optical data generator through an optical interfacing unit to a rotating display which produces three dimensional volumetric images. The optical interfacing unit transforms non-rotating incoming optical data into rotating optical data which is synchronous with the rotating display. If the optical data generator is viewed backwards along the optical path from the display, looking into the output of the interfacing unit, the position and orientation of the optical data generator will be seen as invariant with respect to the rotating display surface.

20 Claims, 8 Drawing Sheets

METHOD AND APPARATUS FOR DISPLAYING THREE-DIMENSIONAL VOLUMETRIC IMAGES

This application is a continuation of application Ser. No. 08/108,331, filed Aug. 18, 1993, now abandoned.

FIELD OF THE INVENTION

This invention relates to the field of three-dimensional image displays and, more particularly, to the volumetric type of display of three-dimensional images.

BACKGROUND OF THE INVENTION

The advance of modern technology and the increasing power of computers are driving a need for display devices that can display three-dimensional ("3D") images. For example, the field of computer aided design, the field of computational fluid dynamics, and the field of recreational media may all benefit from a device capable of displaying three dimensional images. Currently, three-dimensional images are displayed on two-dimensional ("2D") screens in the forms of oblique, or perspective, images. This approach, sometimes called "2.5 D", can no longer satisfy the functional requirements from many fields of work. Therefore, a display device capable of displaying images with truly three-dimensional nature would be very useful.

From a viewer's outlook, the prior art includes two types of three-dimensional display devices. One type, called stereoscopic display, uses a two-dimensional display screen to display images with visually three-dimensional effect. These types of displays are based on either holographic or binocular stereoscopic technology. Holography is a technology that recreates both the amplitude and phase information of an image thereby giving viewers a sense of three-dimensional vision. For an exemplary reference on the basic principles and applications of holography, see E. Hecht, *Optics* (2nd ed.), Addison-Wesley Publishing Co. (Reading, Mass.), 1987, Chapter 14, which is hereby incorporated by reference. Binocular stereoscopic technology includes many variations of techniques, from polarization coding used in 3D movies to Brewster stereoscopes used in virtual reality technology, which operate according to basically one principle: by supplying to the right and the left eye of a viewer images with slightly different perspectives, visual sense of depth is recreated. For an exemplary reference, see S. M. Faris, "True Stereo Display and Hard Copy from One System," *Advanced Imaging*, May 1992, p. 18 et seq., which is hereby incorporated by reference. The major disadvantages of the stereoscopic type of 3D displays are their limited field of view and, in many cases, the need of wearing special glasses or helmets.

Another type of 3D displays is called volumetric display. Volumetric displays have a physically three-dimensional display space and the image displayed actually occupies a 3D space. Viewers can walk around the image and view it at different angles without wearing any kind of glasses. The present invention relates generally to a new method and apparatus for displaying volumetric 3D images.

In the field of volumetric 3D displays, many techniques have been disclosed. One type of apparatus uses a display chamber containing photo- or electro-luminescent particles or gases and means to excite those particles or gases at desired positions to create volumetric images. For example, U.S. Pat. No. 4,063,233 issued Dec. 13, 1977 to Rowe describes such a system using the intersection of two scanning electron beams to create electro-luminescence in a

2 chamber containing suspended phosphor-surfaced particles. U.S. Pat. No. 4,881,068 issued Nov. 14, 1989 to Korevaar et al. is another example. There, rubidium gas was used as the photoluminescent material. A first laser excited a small volume of the gas to the first excited state and a second laser excited the gas to the second state, which then relaxed to emit visible light in all directions.

Another type of volumetric 3D display uses the intersection of a laser beam or an electron beam with a moving screen or disc to generate 3D images that fill a specific volume. At any instant, the laser or electron beam scans the screen or disc and thereby creates an instantaneous 2D image. A series of instantaneous 2D images on the screen or disc displayed successively at corresponding screen positions forms 3D images. There are, as one might expect, many variations on this basic theme. One system, called OmniView, is disclosed by Garcia et al. in U.S. Pat. Nos. 5,042,909 and 4,871,231. OmniView uses a rotating oblique disc receiving a scanning light spot generated by a stationary laser to form volumetric 3D images. A similar method using a vertical screen was reported in Batchko's U.S. Pat. No. 5,148,310 issued Sep. 15, 1992. Similar designs using a moving screen coated with phosphor to receive electron beams emitted from stationary sources were also reported in Marks' U.S. Pat. No. 2,961,486, issued Nov. 22, 1960; in Ketchpel's U.S. Pat. No. 3,140,415, issued Jul. 7, 1964; in Skellet's U.S. Pat. No. 3,204,238, issued Aug. 31, 1965; and in Blundell et al., "Outline of a Low-Cost Prototype System to Display Three-Dimensional Images", *IEEE Trans. Instru. Meas.*, Vol. 40, No. 4, 1991.

The major disadvantage of the above-described types of volumetric 3D displays lies in their "point scanning" nature; that is, the 3D images are created by the scanning of only one or a few "spots" of light in a comparatively huge space. To generate real time animation (i.e., images changing with time) requires an extremely fast scanning speed, since the spot has to travel through a large amount of picture elements ("pixels") or volume elements ("voxels"), within the after-image persistence period of human eyes, which is about 1/20 sec. Assuming a cubic display volume with 500 voxels on each side, the corresponding scanning rate required to generate a 3D animation using a single "spot" will be several hundred MHz to several GHz, which is far beyond the reach of present laser or electron beam scanning systems. As a result, these types of 3D displays currently can only have very limited use.

To overcome the "spot scanning" barrier described in the previous paragraph, the instantaneous 2D images on the moving screen or disc must be generated by multi-spot scanning or full frame projection similar to slide or movie film projection. U.S. Pat. No. 3,604,780 to Martin describes a system with a reciprocating screen receiving optical data generated by a masked light source through many bundles of optical fibers. U.S. Pat. No. 4,294,523 to Woloshuk discloses another method in which the reciprocating motion of the screen is created by the rotation of a set of eccentric rings and the instantaneous 2D images are projected radially onto the rings. Both designs suffer the disadvantages of small display volume and limited view field. U.S. Pat. No. 4,319,805 to Nicolas describes a system with a rotating screen receiving projected images from a stationary projector. This arrangement provides larger display volume and view angle. However, it is obvious that to create complex 3D images requires complicated processing of the projector because the screen is rotating relative to the stationary projector. Varying focal distance is another disadvantage of this design. An improved apparatus was mentioned in U.S. Pat. No. 5,148, 310 to Batchko, wherein the projected images are supplied through a set of reflectors rotating in unison with the screen. This arrangement apparently solves the problem of varying focal distance. However, the relative rotation between the screen and the stationary projected images still exists and an axes rotation processor was therefore necessary. This means a rotation calculation must be performed for each datum in each instantaneous 2D image. Therefore, the processing for the 2D projector may be very time-consuming and thus the technique consequently may not be suitable for real time display of complex 3D images. U.S. Pat. No. 4,983,031 to Soloman describes another method using a rotating screen, with a bigger display volume and a 360 degree viewing field. The instantaneous 2D images are created by masked light pattern and are projected onto the screen through a set of reflectors rotating with the screen. In this method, the light masks have to be prepared through a coding-decoding procedure in order to generate desired instantaneous 2D images on the screen. This coding-decoding procedure together with the bulky setup of reflectors made this design not suitable for practical use. Still another method is disclosed in U.S. Pat. No. 4,160,973 to Berlin. Berlin uses a moving array of light-emitting diodes to generate 3D images. This method transfers image data by means of an axially-located optical link and stores the data in a rotating electronic memory. All of the foregoing methods exhibit difficulty in efficiently transferring image data from the stationary outside world onto the rotating screen. Since the amount of data is so huge and the data have to be transferred in a very short time, with such restrictions, all of the previously cited approaches are not practical for displaying high resolution 3D animation.

SUMMARY OF THE INVENTION

By contrast, in the present invention, optical data is supplied through an optical interfacing unit onto a rotating unit where an attached display means sweeps, due to the rotation, a specific space and produces, according to the incoming optical data, a series of instantaneous profiling images which collectively form a set of 3D images inside that space as viewed from outside, by exploiting the afterimage effect in human vision. The optical interfacing unit functions in a manner such that it can transform a frame of still optical data into a corresponding set of rotating optical data which is synchronous with the rotating unit. A series of frames of optical data generated by a stationary optical data generator can thus be transformed into a series of interfaced optical data constituting an optical data beam synchronous with the position of the rotating unit. Each frame is synchronized with respect to a different angular position of the rotating unit. The rotating unit receives the series of interfaced optical data which produce on the rotating display means a series of instantaneous profiling images, in real time. Each of these instantaneous profiling images is thereby synchronized with respect to a different angular position of the rotating display means. As a result, this series of rotating instantaneous profiling images, viewed outside the rotating unit, with the benefit of persistence of vision, form a real-time volumetric 3D image.

A principal advantage of this invention is that using the optical data interfacing unit described above enables fast transport of a huge information flow from the outside world into the rotating unit. This high information flow rate is necessary if complex 3D animation is to be displayed. Through the use of the interfacing unit, optical data generated by the stationary optical data generator can be made to follow the rotation of the rotating unit, while avoiding relative motion. As a result, real time, simultaneous, and continuous transport of a large matrix of pixels of optical data can be achieved. No processing of axis rotation is required in the stationary optical data generator and the optical-to-optical transfer enables the maximum possible information flow rate. In fact, in one preferred embodiment of this invention, the series of instantaneous profiling images to be displayed on the rotating display means is projected frame by frame directly at the optical data generator and is transported instantly and successively onto the rotating display means.

The display means on the rotating unit can take many forms, so long as it contains a means that sweeps a specific domain in space. One typical example is a screen which is attached to the rotating unit and rotates with it.

The optical data interfacing unit can also have many forms, so long as it performs the task described previously. One typical example is based on the principle of the coelostat used on astronomical telescopes. The operating principle of a mechanical optical data interfacing unit based on a coelostat is as follows: supplying optical data from a stationary source onto a reflector spinning along an axis parallel to and passing through the reflecting surface of the reflector creates reflected optical data rotating at an angular speed twice the angular speed of the spinning reflector.

The optical data generator also can take many forms, so long as it generates real images. It can be an optical image projector, a laser with X-Y scanners, or any other devices.

The invention will be more fully understood from the detailed description presented below, which should be read in conjunction with the accompanying drawing.

BRIEF DESCRIPTION OF THE DRAWING

In the drawing.

FIG. 3b shows the reflection dead zone of the apparatus shown in FIG. 3a;

DETAILED DESCRIPTION

The basic principle of generating 3D images by use of a rotating display means is based on the afterimage (i.e., persistence of vision) effect of human sight, which is also the basis for the display of motion in movies and on television. A rapidly displayed sequence or series, of instantaneous 2D images on a screen (in this case, a rotating screen) forms a three-dimensional volumetric image in space, as viewed from outside. For example, if the instantaneous profiling image (as viewed in the rotating coordinate frame) is a curve, a 3D surface will be formed as the curve rotates. A series of instantaneous 2D images of arbitrary curves displayed successively on the rotating screen at corresponding rotational positions thus forms a corresponding 3D image which can be stationary or in motion.

In the most general case, an embodiment of apparatus for practicing the present invention can be described and understood in terms of three major functional units: an optical data generating unit, an interfacing unit, and a rotating unit. By functional units, we mean that the operation of the embodiment can be functionally conceptualized as a combination of three units, which can be, but do not necessarily have to be, three physically distinctive components. Each functional unit, or component, can be implemented in numerous different ways. Any combination of three designs, each of a different functional unit, can become a preferred embodiment of the present invention.

Figure 1:
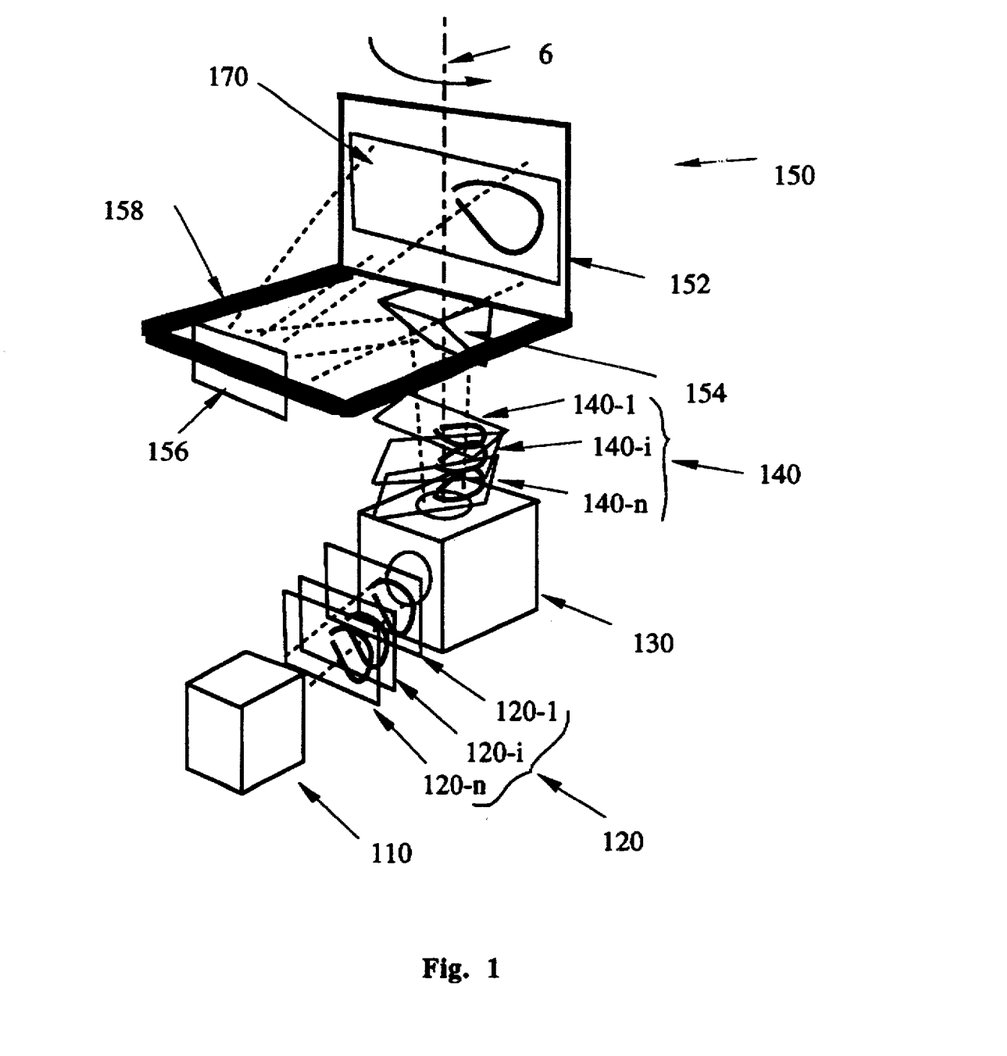
FIG. 1 shows a diagramatic view of a first embodiment of apparatus according to the invention.

FIG. 1 shows a diagramatic view of a first exemplary embodiment of apparatus according to the invention. There are three functional units: optical data generating unit 110, interfacing unit 130, and rotating unit 150. The rotating unit 150 depicted here comprises a first reflector 154, a second reflector 156, and a display member 152, all of them fixed to a connecting structure 158, which maintains their relative arrangement. The optical data generating unit 110 generates a series of instantaneous frames of profiling images 120-1 through 120-n and transports them to the interfacing unit 130. The optical interfacing unit 130, described more fully below, functions in a manner that it can transform a frame 120-i of still image into a corresponding rotating image 140-i which rotates about a common axis 6 and is synchronous with the rotating unit 150. A series 120 of frames of images 120-1 . . . 120-n generated by a stationary optical data generator 110 can thus be transformed into a series 140 of interfaced images 140-1 . . . 140-n wherein the interfaced image beam is synchronous with and stationary relative to the rotating unit 150, and each frame is reoriented to match a different angular position of the rotating unit. The first reflector 154 reflects the images onto the second reflector 156 which projects the images onto the display member 152. The series of instantaneous 2D images 170 on the rotating display member 152 thus forms a three-dimensional volumetric image as viewed from outside, by virtue of the persistence effect of human vision.

Figure 2:
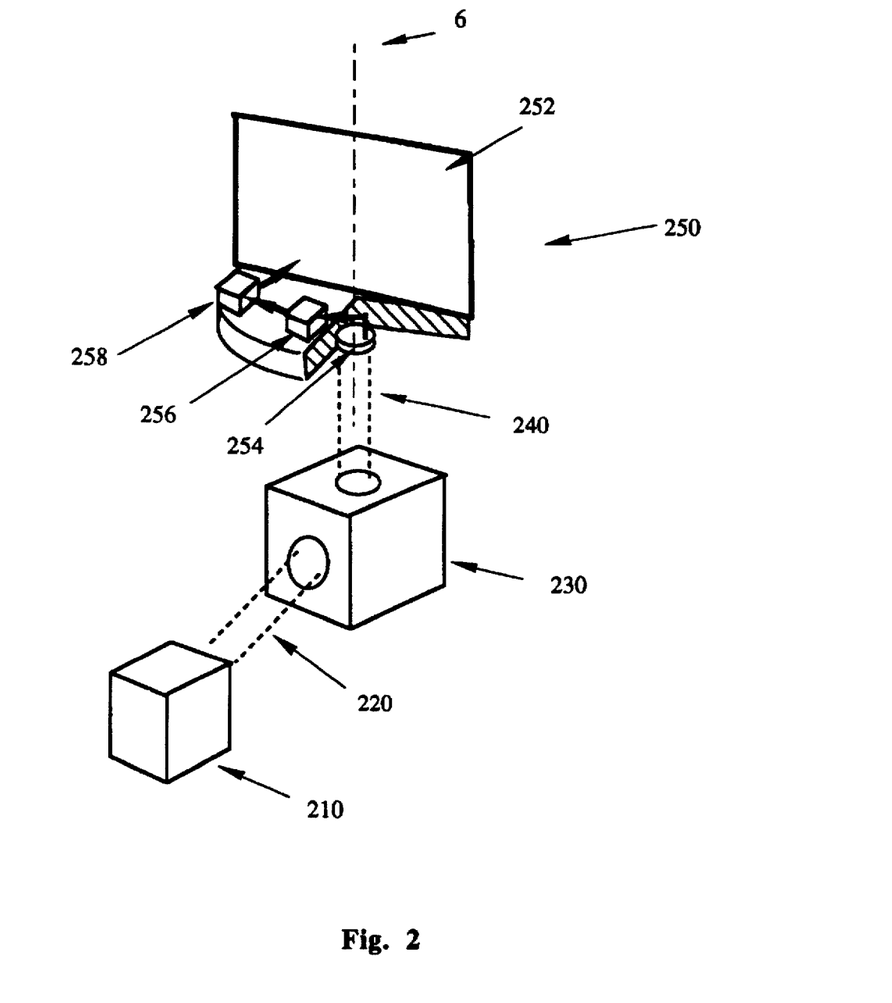
FIG. 2 shows a diagramatic view of a second embodiment of apparatus according to the invention.

FIG. 2 shows a diagramatic view of a second exemplary embodiment. In this embodiment, the set of optical data 220 generated by the optical data generator 210 is a set of frames of optical signals, which can be in the forms of (for example) scanning light spots, a matrix of light dots, interference patterns, or any other optical patterns in real images. The optical interfacing unit 230, which is functionally similar to the interfacing unit 130 in FIG. 1, described previously, converts this set of optical signals into a corresponding beam of interfaced optical data 240. The interfaced optical data beam is formed of a succession of corresponding frames whose orientations are successively rotated about the common axis 6 synchronously with the rotating unit 250 which comprises an optical detector 254, a signal processor 256, a display driver 258, and a display member 252. The optical detector 254 can be a matrix of photosensitive elements such as phototransistors or any other opto-electronic devices capable of receiving the corresponding incoming optical data 240. Because of the operation of the interfacing unit, the interfaced optical signals 240 can reach and map onto the matrix of optical detector 254 without any motion relative to it. The optical detector can thus detect the optical signals continuously in multiple channels and send corresponding electrical signals to a signal processor 256 which processes those signals and then transfers them to a display driver 258. In turn, display driver 258 illuminates display member 252. The display member 252 and associated display driver 258 inside the rotating unit 250 can take many forms. For example, an electron gun together with a phosphor screen can act as a rotating cathode ray tube. Alternatively, display member 252 may be a flat panel display device, such as a light-emitting diode matrix or a liquid crystal display screen. Other suitable implementations will from time to time occur to those skilled in the art.

In general, the optical data generating units 110 and 210 in FIGS. 1 and 2, respectively, can be an optical image projector, a laser with X-Y scanners, a movie projector, or any other device that can project real optical images. At present, two types of projectors are believed to give the best results because of their high resolution and high frame rate. The first is the so-called Digital Micromirror Device or Deformable Mirror Device (DMD) which consists of a matrix of actuated small reflectors. By striking the matrix with a light beam and adjusting the positions of each reflector, arbitrary image patterns can be created by projecting the reflected light beam onto a screen. This device has already been commercialized. The principle of DMD is fully described in L. J. Hornbeck, "Deformable-Mirror Spatial Light Modulators," *SPIE Critical Reviews Series*, vol. 1150, pp. 86. The other is a matrix of microlasers. Techniques have been developed to produce a matrix of microlasers on a single substrate by patterning and selective etching a semiconductor with a multilayer structure of gallium arsenide, indium gallium arsenide, and other alloys. Integrated electronic circuits can be fabricated together with themicrolaser matrix to drive each microlaser independently so that arbitrary image patterns can be created. These image patterns can then be projected, with a lens, onto a screen. The technology of producing this microlaser matrix is described in J. L. Jewell et al., "Microlasers," *Scientific American*, Nov. 1991. pp. 86.

The optical data generated by the unit can be a series of instantaneous profiling images which can form the 3D images by rotating, as in the case of the embodiment in FIG. 1; or can be a series of optical signals which can generate a series of instantaneous profiling images on the rotating display means through optical data processing devices such as illustrated in the second embodiment depicted in FIG. 2.

Figure 3A:
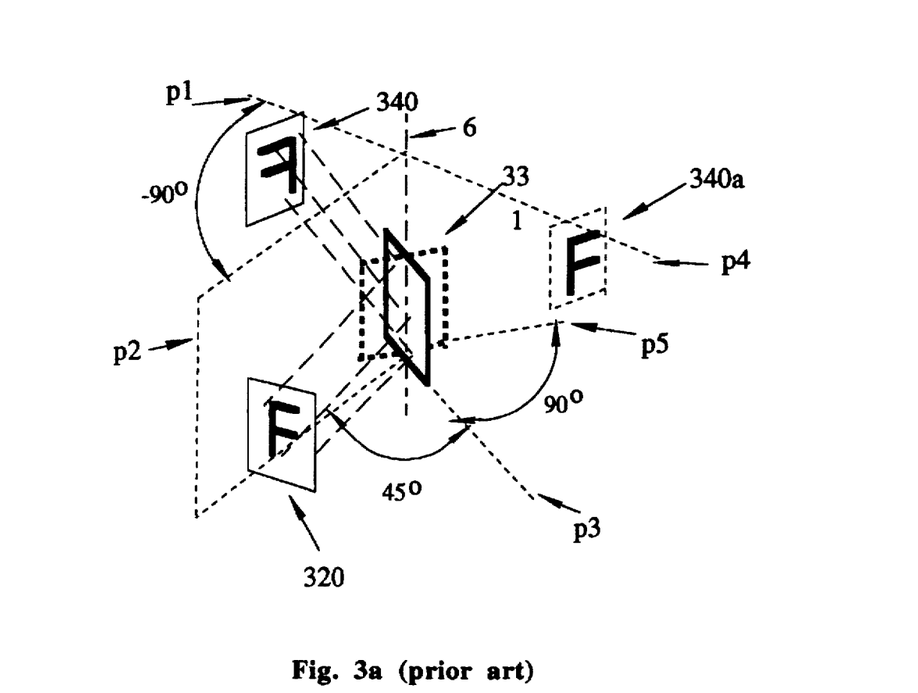
FIG. 3a shows a diagramatic view of a coelostat known to the prior art.

The optical data interfacing unit 130 or 230 (FIGS. 1 and 2) can be implemented in a variety of ways which will occur to those skilled in the art. One typical example is based on the principle of the coelostat used on astronomical telescopes For reference, discussion of the principles and applications of the coelostat can be found in many astronomy books, such as A. E. Troy et al (eds.), *Astronomy: Principles and Practice*, 3rd ed., Bristol, England, 1988, Chapter 17, which is hereby incorporated by reference. The operating principle of a mechanical optical data interfacing unit based on a coelostat is as follows, referring to the first preferred embodiment shown in FIG. 3a. A still frame of optical data 2 is projected from a stationary source (not shown) onto a two-sided reflector 331 spinning along an axis 6 parallel to and passing through the reflecting surface of the reflector. This creates reflected optical data 4 rotating at an angular speed twice the angular speed of the spinning reflector 331. In FIG. 3a, the optical data beam is represented by an image 320 of the letter "F", which propagates along the p2 plane. When the reflector 331 is at position p3, which is 45 degrees with respect to the P2 plane, one can obviously see that the reflected image 340 is at position p1, −90 degrees with respect to the p2 plane. When the reflector 331 rotates 90 degrees to position p5, the reflected image 340a rotates correspondingly to position p4 which is 180 degrees away from the original position p1. This figure clearly depicts how the reflected image rotates at twice the rate of the reflector. To obtain the best result, the reflecting surface of the reflector 331 can be a very thin double-sided reflector. Practically, this can be achieved by applying a reflective coating on one side of a transparent plate.

Figure 3B:
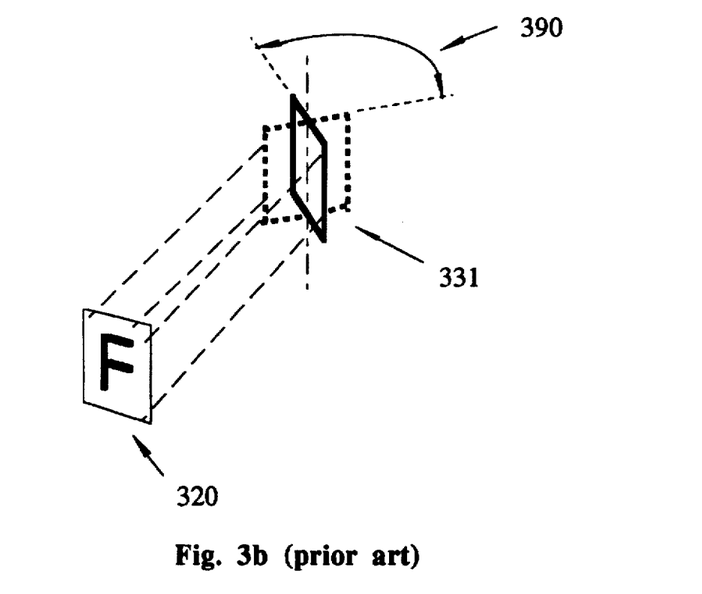

One problem of the embodiment of the interfacing unit described in FIG. 3a is that there can be a reflection dead zone when the spinning reflector rotates around an angular range where the reflector 331 can not capture all the incoming optical data. FIG. 3b depicts this dead zone schematically. In FIG. 3b, one can see that the reflected image rotates effectively only in an angular range 390, which is less than 360 degrees.

Figure 4:
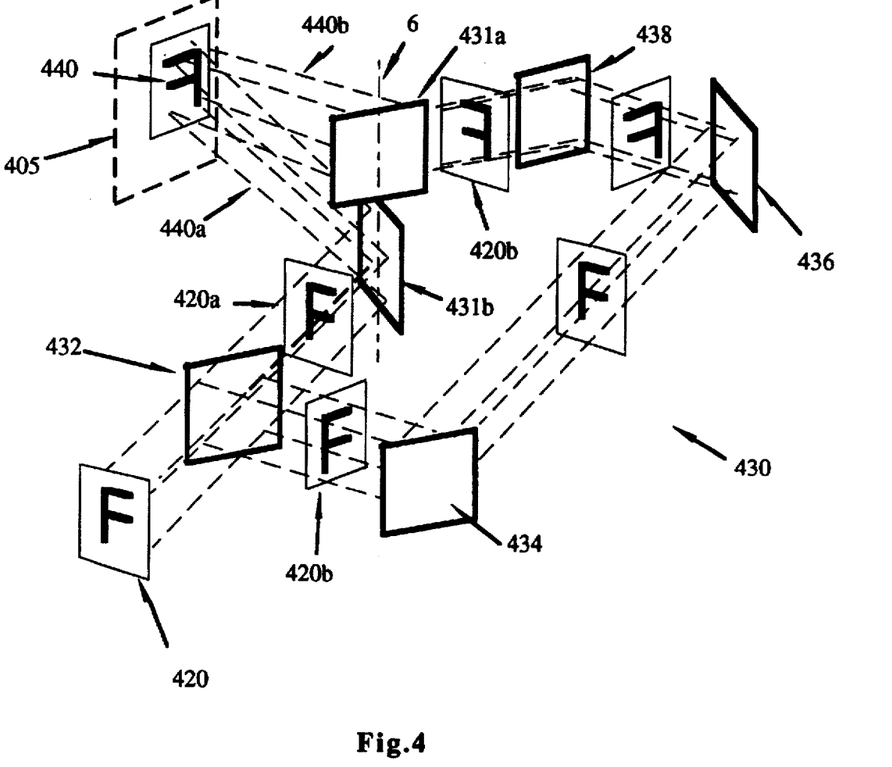
FIG. 4 shows a first exemplary embodiment of the interfacing unit for the apparatus of the present invention.

To create rotating images in the full 360-degree range, two sets of coelostats can be combined, each compensating for the dead zone of the other. FIG. 4 shows a second embodiment of the interfacing unit based on this principle. The stationary optical data 420 is first split into two beams 420a and 420b by a beam splitter 432. The first beam of optical data 420a is projected onto a first spinning reflector 431b and is then reflected as beam 440a. A second spinning reflector 431a is spinning about the same axis 6 on top of the first reflector 431b and lags, or leads, 431b by 90 degrees. A set of reflectors 434, 436 and 438 guides the second beam of optical data 420b on to the reflector 431a in the opposite direction from the beam 420a. Beam 420b is then reflected as beam 440b by reflector 431b. The reflected beams 440a and 440b thus rotate in unison and can be brought together at a suitable focal plane 405 to become one image 440. This image 440 is an overlap of the optical data 420a and 420b and can rotate about axis 6 without any dead zone because of the mutual compensation of beams 440a and 440b. It will be appreciated that unless collimated beams are employed, the focal lengths of the two paths traversed by beams 420a and 420b from 420 to 440 should be made equal and that the drawing is not to scale. Of course, other geometries will also satisfy these requirements.

Figure 5:
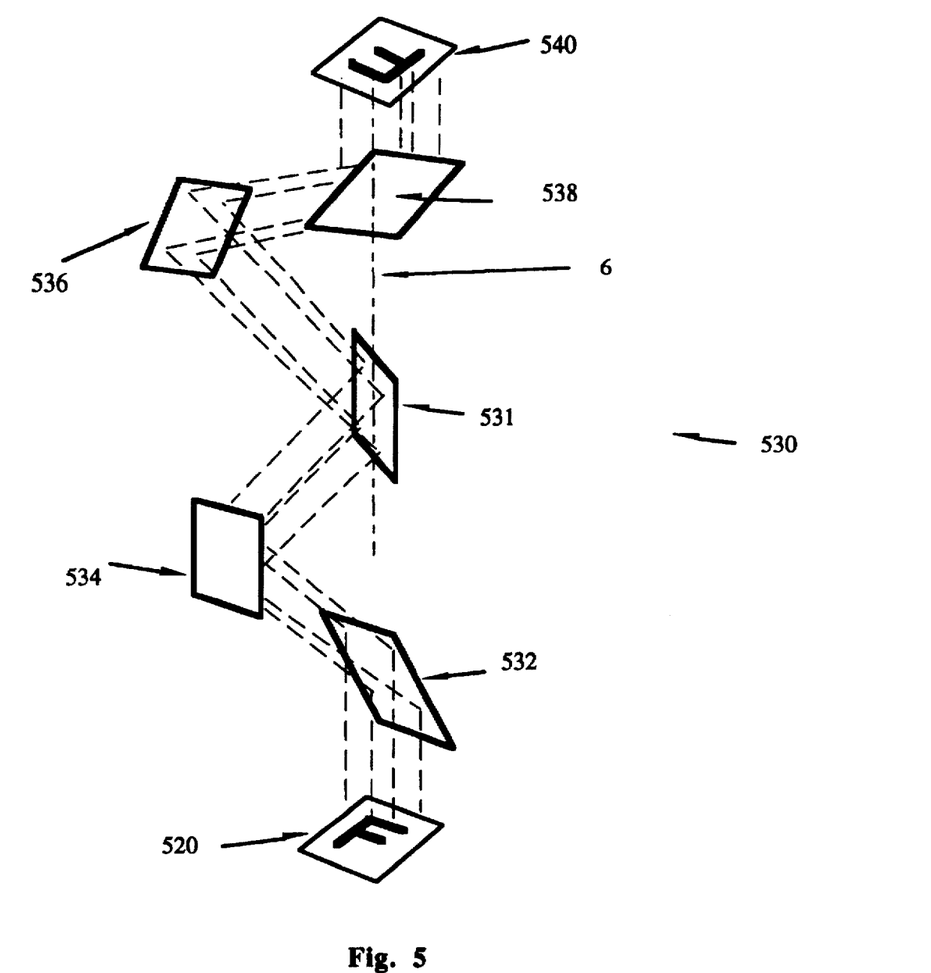
FIG. 5 shows a second exemplary embodiment of the interfacing unit for the apparatus of the present invention.

FIG. 5 shows a diagramatic view of a third embodiment of the optical data interfacing unit. In this embodiment, both the input stationary optical data 520 and the output rotating optical data 540 propagate along the common axis 6. The embodiment consists of two fixed reflectors 534 and 532, one reflector 531 spinning about the common axis 6 parallel to and passing through its reflecting surface, and a pair of reflectors 536 and 538 rotating about an axis passing through the center of one of the reflector 538 and axis 6 while the relative position between reflectors 536 and 538 is fixed. The pair of reflector 536 and 538 rotates at a rate twice that of the reflector 531. As a result, a stationary image 520 can be transformed into an image 540 rotating at the same rate as reflectors 532 and 538.

The display member on the rotating unit can be implemented in any suitable form so long as it displays images according to the incoming optical data and sweeps a specific domain in space.

Figure 6:
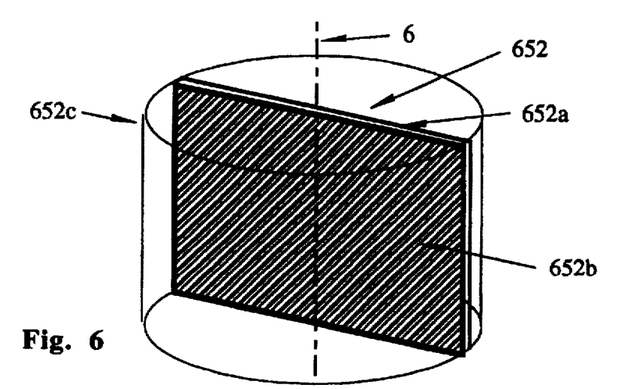
FIG. 6 shows a first possible geometry of the display means.

Turning to FIGS. 6–8C, various forms of display members are illustrated. The simplest design is a flat screen (FIG. 6) with the common axis 6 parallel to and passing through its display surface. FIG. 6 shows a preferred geometric structure of the display member. The display member 652 consists of a screen body or frame 652a and a flat display surface 652b. The screen body supports the display surface. The screen body is transparent and the display surface is semi-transparent so that images displayed on the display surface can be seen on the both sides of the screen. The display surface is also very thin so that the 3D-images resolution in the tangential (rotational) direction can be kept small. The common axis 6 is parallel to and passes through the display surface 652b. As a result, any position inside the space domain 652c defined by the revolution of the edges of the display surface about the common axis can be addressed and used for displaying 3D images.

Figure 7A:
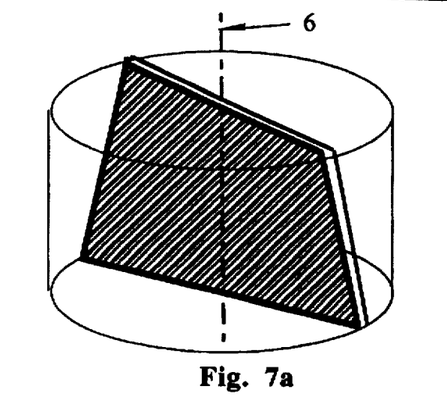
FIGS. 7a-7c and 8a-8c show respectively, two examples of possible geometries A and B of the display means, with their top views, side views, and perspective views.
Figure 7B:
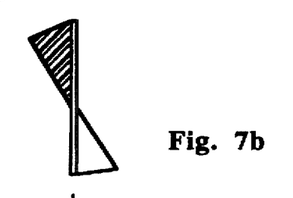
Figure 7C:
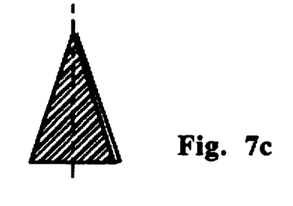
Figure 8A:
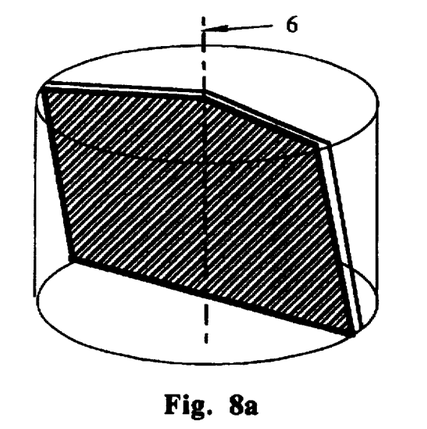
Figure 8B:
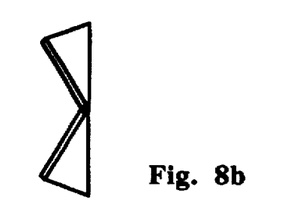
Figure 8C:
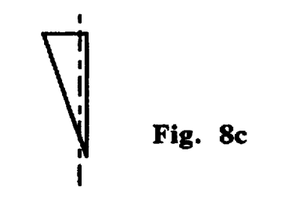

One problem of the flat screen is that the 3D images generated will contain a dark vertical line in the middle of the image. That is, at any viewing position, the screen will, twice during each rotation, pass through an angle at which the whole display surface becomes a single line and images on the screen become invisible. This problem easily can be overcome by using a three-dimensional display surface all or part of which can be visible at all times, irrespective of angular orientation. There are many possible shapes meeting this criterion. FIGS. 7a–8c show two examples of possible geometric structures of such a display surface, with their top views, side views, and perspective views. In the case of FIGS. 7a–7c, the display surface is twisted as a near-helical shape. As a result, most parts of the display surface can always be seen from any viewing angle, as illustrated in the Figures. In the case of FIGS. 8a–8c, the display surface is distorted into a concave surface, and similar effects can be achieved.

Many possible display technologies can be used to manifest the image on the display screen. A first type of display screen has a passive display surface which displays images only when real images are focused and optically projected onto it. A plain, flat, white semi-transparent surface is the simplest example. Another type of passive display surface is a photoluminescent coating, or a translucent coating, or a diffusive texture or coating on the screen body. A general different type of display has active light-emitting devices which are usually driven by electronic signals. Typical examples are: (1) a liquid crystal display (LCD); (2) an electro-chemical display which uses oxides of transition metals such as amorphous tungsten oxide, molybdenum oxide, or iridium oxide; (3) a plasma display; (4) an electroluminescent display; (5) a vacuum fluorescent display (VFD); (6) a suspended particle display; (7) a light-emitting diode array; and (8) a cathode ray tube display. Naturally, variations of these type of displays can be employed as well, in addition to other technologies and combinations of active and passive display or multiple active display technologies may also be used.

As pointed out previously, the present invention may be implemented with a large number of combinations of different constructions of the three functional units, both embodiments disclosed and embodiments not specifically disclosed but within the skill of those working in this technology. There are several specific alternative embodiments which can be deduced from these combinations.

Figure 9A:
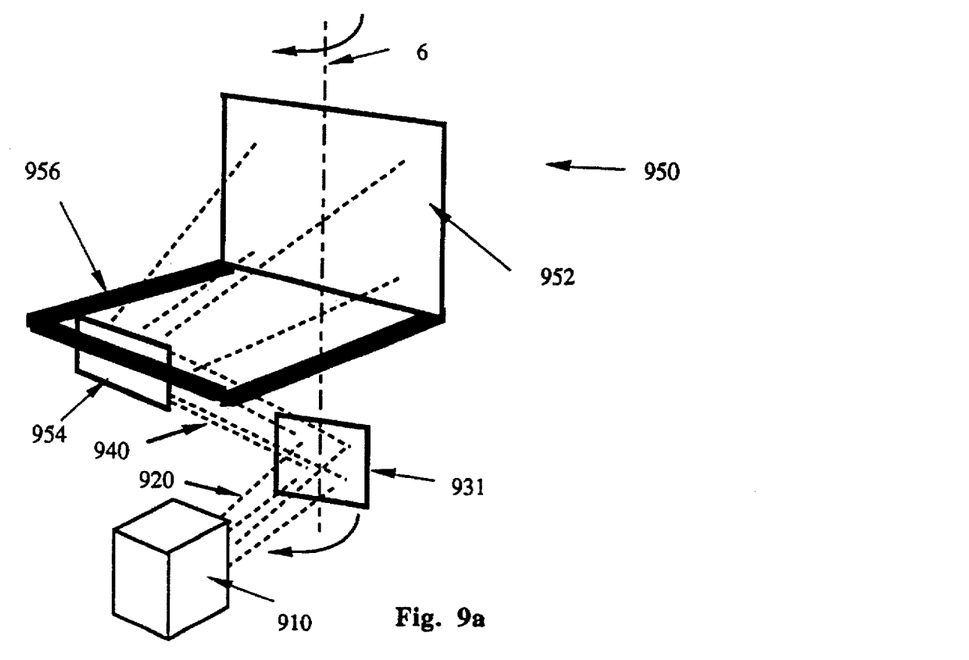
FIG. 9a shows a diagramatic view of a third exemplary embodiment of the apparatus of the invention.

For example, FIG. 9a shows yet a third embodiment of the present invention. This embodiment comprises an image projector 910, a rotating display screen 952, a reflector 931 spinning about a common axis 6 parallel to and passing through its reflecting surface, and a reflector 954 rotating with the display screen 952 about the common axis 6. The relative position between the reflector 954 and the display screen 952 is fixed by a support structure 956. In this embodiment, the images 920 projected by the image projector 910 can be projected onto the rotating screen 952 without relative motion to it through the interaction of reflector 931 and reflector 954 (which is secured on a connecting structure or frame 956) based on the principle of the coelostat. The reflector 954 and the screen 952 rotate at a rate twice that of the reflector 931. As a result, the incoming optical data 920 can be projected onto the reflector 954 and screen 952 invariantly. The projected images 940 are thus the instantaneous profiling images which form the 3D images by rotating. In this embodiment, the optical data generating unit is the image projector 910; the rotating unit consists of the screen 952 as the display means and the reflector 954 as the optical data processing device where the processing is simply reflection; and the interfacing unit is simply the spinning reflector 931.

Figure 9B:
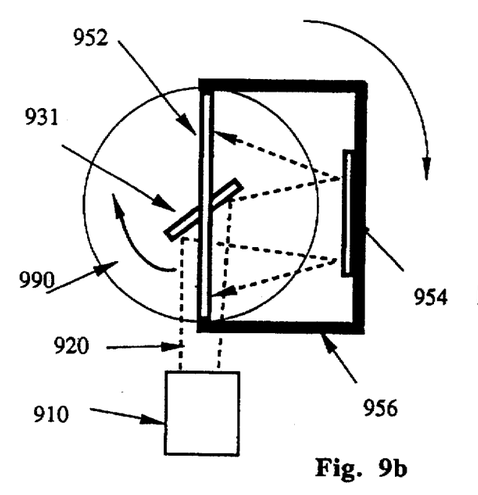
FIGS. 9b and 9c show two top views of the apparatus shown in FIG. 9a, annotated to schematically illustrate its operation in two positions.
Figure 9C:
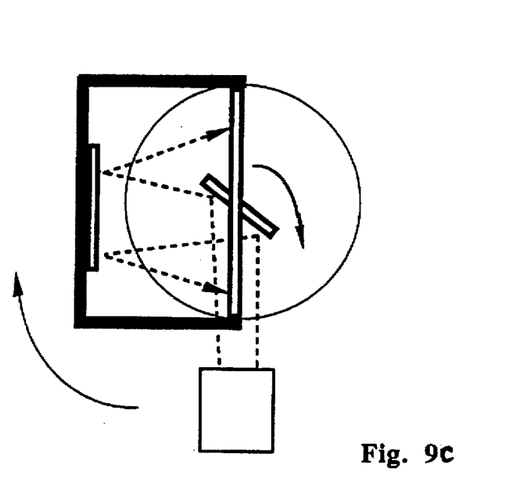

The embodiment in FIG. 9a is actually a modification of the combination of the apparatus of FIGS. 1 and 3a. It was mentioned that the embodiment in FIG. 3a has a reflection dead zone. However, employing the single reflector interfacing unit into this embodiment of a 3D display poses no display dead zone. This is because for every turn of the spinning reflector 931, the screen 952 rotates two turns. The display space can be fully addressed by only a half turn of the display screen 952 (180 degree), and the corresponding rotation of the spinning reflector 931 is only 90 degrees. Thus, if the position of the spinning reflector 931 relative to the screen and the projected images is chosen carefully such that there is at least 90 degrees of effective reflection (i.e., keep the dead zone off this 90-degree region), then the whole display space can be addressed by the projected optical data. FIG. 9b illustrates this idea. This top-view of the preferred embodiment show that the display screen 952 sweeps the whole display volume 990 in a 180-degree rotation and the reflector 931 rotates 90 degrees correspondingly. The reflector 931 is able to fully receive the optical data 920 and fully reflect the data onto the screen during this period.

Figure 10:
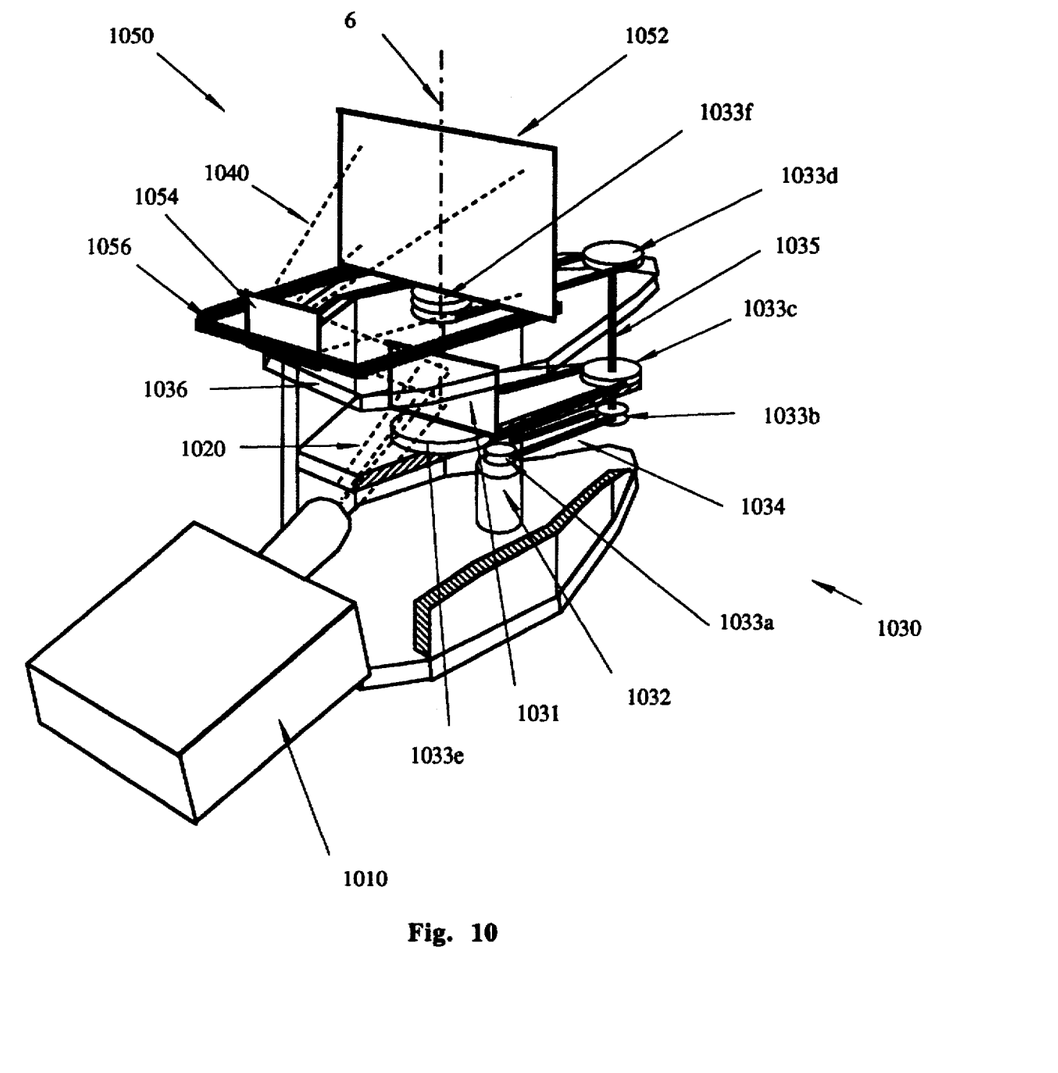
FIG. 10 shows a diagramatic view of a fourth exemplary embodiment of apparatus according to the invention.

In general, when a mechanical interfacing unit based on the principle of the coelostat is used, the angular speed of the spinning reflector in the interfacing unit is half the angular speed of the rotating unit. This angular speed difference can be maintained in many ways. Two motors can be used to drive the rotating unit and the spinning reflector respectively and the angular speed difference can be controlled by a servo system. The angular speed difference can also be maintained by using gear-belt systems and a single motor. FIG. 10 shows a diagramatic view of a fourth preferred embodiment of the present invention. In this embodiment, the rotation of the display screen 1052 and the reflector 1054 is driven by a motor 1032 through a driving shaft 1035 and a set of gears and timing belts. The motor drives the shaft through gear 1033a, belt 1034, and gear 1033b. On the driving shaft, gear 1033c drives the reflector 1031 through a gear 1033e attached to it; and gear 1033d drives the rotating unit 1050 through a gear 1033f attached under the screen 1052. The gear ratio between gears 1033e and 1033c is twice that of the gear ratio between gears 1033f and 1033d. As a result, the reflector 1031 rotates at half the angular speed of the rotating unit 1050. Both the rotating unit 1050 and the reflector 1031 rotate about the common axis 6, which is parallel to and passes through the display surface of the screen 1052 and the reflecting surface of the reflector 1031. The rotating unit 1050 and the gear 1033f are supported on a transparent base 1036. The instantaneous 2D images 1020 generated by the optical data generator 1010 are converted into interfaced images 1040 by the reflector 1031. The transparent base 1036 allows the images to be transported onto reflector 1054 which then projects the images onto the screen 1052.

In all the preferred embodiments mentioned above, lenses and reflectors with various shapes can be incorporated to predistort the original two dimensional images, to enlarge (or reduce) the final projected images, or to achieve any other effects required. Positions and angles of reflectors can also be varied, so long as they perform the basic functions as described. For example, in the embodiment depicted in FIG. 10, since the propagating direction of the images is not normal to the screen, curved reflectors or non-linear lenses can be incorporated to correct the images, such that the projected images on the screen can be in focus and free of distortion.

The illustrated embodiments of the interfacing unit discussed in this application have most often been mechanical structures. They are simple, easy to construct, and low-cost. However, it is also possible to construct the interfacing unit by opto-electronic methods when desired. Therefore, variations of the interfacing unit are not limited to the embodiments mentioned above. In general, the optical data interfacing unit is an imaging means; it can image a still frame of optical data projected from the optical data generating unit and make it into a corresponding rotating picture frame which is synchronous with (i.e., has its position and orientation invariant relative to) the rotating unit. Functionally, as will be shown, the position and orientation of the optical data generating unit as imaged through the interfacing unit is always invariant with respect to the rotating unit. In other words, for an observer sitting on and rotating with the rotating unit, the optical data generating unit as seen through the interfacing unit is stationary: i.e., it does not move or rotate, with respect to the observer. Taking previously described mechanical interfacing units as examples, as shown in FIG. 3a, FIG. 4, and FIG. 5, one can see that the letter "F" can be "interfaced" into synchronization with the rotating unit such that its position and orientation are both invariant relative to the rotating unit, as indicated in 340 and 340a in FIG. 3a, in 440 in FIG. 4, and in 540 in FIG. 5. In FIG. 9, one can also see that when imaged by the reflector 931 the optical data generating unit 910 can keep its position and orientation relative to the rotating unit invariant. In principle, any imaging means capable of this function can be used to make the interfacing unit. For example, an opto-electronic interfacing unit can be made by modifying an image converter tube. In principle, an image converter consists of a photocathode which reacts to an input optical image and converts them into a photoelectron image. The photoelectron image is projected onto a fluorescent screen by means of magnetic or electric focusing lenses. Details of some typical image converter tubes are described in *The Way Things Work*, Caves Books, Taipei, 1977, pp. 128, and T. Takeshita et al., "Framing Streak Camera," *SPIE vol.* 1593 *Ultrahigh- and High-Speed Photography, Videography, and Photonics*, '91, pp. 2. By adjusting the intensity, diameter, or length of the magnetic focusing lens, the orientation of the projected photoelectron image can be adjusted. As a result, a modified image converter with a circuit which adjusts the magnetic lens parameters periodically can create a photoelectron image which is identical to the input optical image but is reoriented. Thus, the function of the interfacing unit can be achieved. For another example, a modified DANE array can be used as an interfacing unit. Each element of the DANE array consists of a photodetector, amplifier, inverter, and output laser (emitter). An image projected onto the photodetector side can be decomposed into pixels of image signals. A circuit can be used to drive the inverters and thus control the output emitters according to the input image pixels to achieve desired conversion function. Details of the DANE array is described in P. S. Guilfoyle, "A Third-Generation Digital Optical Computer," *PHOTONICS SPECTRA*, May 1993, pp. 116. As a result, a modified circuit with a memory buffer can drive the emitters to form an image pattern which is identical to the input image but is reoriented. In this way, the function of the interfacing unit can also be achieved. In the above two examples of interfacing unit, the modified image converter and the modified DANE array device, the input optical data is basically the same data as the output optical data except that the output optical data sequence is reoriented. However, using a DANE array device, an input optical data can be converted into a different output optical data. The conversion circuit in the DANE array can be used to convert a sequence of optical signals, representing a set of instantaneous 2D profiling images to be composed into a 3D volumetric image, in the form of pixels of images not recognizable by human eyes, to a corresponding, reoriented sequence of the optical images. In another word, the input to the interfacing unit is an optical signal which cannot be recognized by human eyes, and the output is an optical image which is to be perceived by human eyes. Broadly, the invention involves a method for displaying a three-dimensional volumetric image, comprising the steps of: a. receiving a sequence image signals representing a sequence of optical images; b. in response to the sequence of image signals, generating a corresponding sequence of second optical images, each of the second optical images being oriented about a common axis and angularly displaced relative to each other of said second optical images; and c. projecting each of said second sequence of optical images onto a rotating display surface.

Another important feature of the present invention is its compatibility with current profiling display software. A practical 3D volumetric display for computer use should be able to display images created by present day 2D software in 2D forms. This can be a straightforward process in the present invention. One can stop the rotation of the rotating unit and the reflector in the interfacing unit and use the screen to display 2D images.

The foregoing discussion should be understood as illustrative and should not be considered to be limiting in any sense. While this invention has been particularly shown and described with reference to certain embodiments thereof, it will be understood that these embodiments are shown by way of example only. Those skilled in the art will appreciate that various changes in form and details may be made therein without departing from the spirit and scope of the invention as defined by the following claims and their equivalents.

Having described the invention, what is claimed is:

1. A method for displaying a three-dimensional volumetric image base on a sequence of optical image frames from an optical data generator comprising the steps of:
    a. rotating a display surface about a common axis;
    b. projecting a sequence of optical image frames from a stationary optical data generator;
    c. imaging the projected image frames through an interfacing unit, the position and orientation of the optical data generator as imaged through said interfacing unit being always invariant with respect to the rotating display surface; and
    d. projecting the image frames made from the interfacing unit onto the rotating display surface.

2. The method of claim 1 wherein the step of imaging the projected image frames includes (i) the step of revolving a reflector about an axis and (ii) the step of directing the sequence of optical image frames onto said reflector, and the step of rotating the display surface includes rotating the display surface at a rate twice the rate of revolution of said reflector.

3. The method of claim 1 wherein the step of imaging the projected image frames includes (i) the step of using a photo electric transducer to convert the image frames projected from said optical data generator into a corresponding sequence of photoelectron data frames and (ii) the step of rotating the orientation of each photoelectron data frame a different angle about said common axis, and the step of displaying the reoriented photoelectron data frames using an electron-to-photon transducing device.

4. The method of claim 3 wherein the photo electric transducer is a photocathode and the electron-to-photon transducing device includes an electro luminescent material illuminated by electrons from the photocathode.

5. The method of claim 1 wherein the step of imaging the projected image frames includes (i) the step of using a photodetector matrix to convert said image frames projected from said optical data generator into a corresponding set of matrixes of electronic signal frames, (ii) the step of rotating the orientation of each said electronic signal frame a different angle about said common axis by electronically processing said electronic signal frames, producing reoriented electronic signal frames, and (iii) the step of displaying the reoriented electronic signal frames on a display.

6. A method for displaying a three-dimensional volumetric image based on a sequence of picture frames of optical signals from an optical data generator comprising the steps of:
    a. rotating a rotating unit about a common axis, the unit having a display surface and an optical signal processing means;
    b. projecting a sequence of picture frames of optical signals from a stationary optical data generator;
    c. imaging the projected picture frames through an interfacing unit, the position and orientation of the optical data generator when viewed through said interfacing unit being always invariant with respect to the rotating unit;
    d. receiving and processing the picture frames of optical signals made from the interfacing unit to form a corresponding final sequence of image frames; and
    e. displaying said final sequence of image frames on the rotating display surface.

7. The method of claim 6 wherein the step of imaging the projected picture frames includes: (i) the step of revolving a reflector about an axis and (ii) the step of directing the sequence of picture frames from the optical generator onto said reflector, and the step of rotating the rotating unit includes rotating the rotating unit at a rate twice the rate of revolution of said reflector.

8. The method of claim 6 wherein the step of imaging the projected picture frames includes (i) the step of converting the sequence of picture frames into a corresponding sequence of photoelectron data frames, (ii) the step of rotating the orientation of each photoelectron data frame a different angle about said common axis, producing reoriented photoelectron data frames, and (iii) the step of displaying the reoriented photoelectron data frames includes directing the photoelectron data frames into an electroluminescent screen.

9. The method of claim 6 wherein the step of imaging the projected picture frames includes (i) the step of converting the sequence of picture frames into a corresponding set of matrixes of electronic signal frames and (ii) the step of rotating the orientation of each said electronic signal frame a different angle about said common axis by electronically processing said electronic signal frames, producing reoriented electronic signal frames, and the step of displaying includes displaying the reoriented electronic signal frames on a display member.

10. An apparatus for displaying a three-dimensional volumetric image, comprising:

a. a stationary optical data generating unit for supplying optical data;
 b. a rotating unit rotating about a common axis;
 c. an optical interfacing unit comprising an imaging means, the position and orientation of the optical data generating unit when viewed through the interfacing unit being always invariant with respect to said rotating unit; and
 d. in said rotating unit,
   1. a processing means which receives optical data from said optical interfacing unit and produces a corresponding sequence of optical images, and
   2. a display member which displays said sequence of optical images.

11. The apparatus according to claim 10, wherein said optical data generating unit comprises a microlaser matrix.

12. The apparatus according to claim 10, wherein said optical data generating unit comprises a digital micromirror device.

13. The apparatus according to claim 10 wherein said optical interfacing unit comprises a reflector spinning about said common axis at a rate half the rate of revolution of said rotating unit, and the common axis being parallel with and passing through a reflecting surface of said reflector.

14. The apparatus according to claim 13, further comprising a common driving shaft and a motion transmission means for driving, via said shaft, said rotating unit and the rotating reflector of the interfacing unit.

15. The apparatus of claim 10, wherein said optical interfacing unit comprises:

a. first and second reflectors rotating about said common axis at a rate half the rate of revolution of said rotating unit, said common axis being parallel to and passing through reflecting surfaces of said two reflectors;
 b. a beam splitter for splitting the optical data from the optical data generating unit into two beams of optical data;
 c. reflector means for reflecting said two beams of optical data onto said first and second reflectors respectively, said reflector means and said two rotating reflectors reflecting said two beams of optical data and overlapping said reflected beams at a distance.

16. The apparatus of claim 10, wherein said optical interfacing unit comprises:

a. a first reflector rotating about the common axis at a rate half the rate of revolution of said rotating unit;
 b. said common axis being parallel to and passing through a reflecting surface of said first reflector;
 c. second and third reflectors which together receive and reflect the optical data from said optical data generating unit onto said first reflector; and
 d. fourth and fifth reflectors which together receive the optical data reflected from said first reflector and reflect the optical data therefrom away along said common axis; and
 e. Said fourth and fifth reflectors rotating about said common axis at an angular speed twice that of said first reflector.

17. The apparatus of claim 16, wherein said display member comprises a projection screen and said processing means comprises a reflector system which receives interfaced optical images from said optical interfacing unit and reflects said interfaced optical images onto the projection screen.

18. The apparatus of claim 17, wherein the projection screen includes a thin display surface and said common axis is parallel with and passes through said thin display surface.

19. The apparatus of claim 17, wherein the display member has a non-flat geometry such that at least a portion of said display member's surface is visible at all times when said member rotates.

20. The apparatus of claim 10, wherein said processing means comprises an optical detector which receives interfaced optical signals from said optical interfacing unit and outputs corresponding electrical signals, a signal processor which converts said electrical signals into display signals; and wherein said display member comprises an electronic display device which displays optical images in response to said display signals.

* * * * *

UNITED STATES PATENT AND TRADEMARK OFFICE
CERTIFICATE OF CORRECTION

PATENT NO. : 5,754,147

DATED : May 19, 1998

INVENTOR(S) : Che-Chih Tsao, Zhen-Hong Zhou, Albert K. Hu

It is certified that error appears in the above-identified patent and that said Letters Patent is hereby corrected as shown below:

IN THE CLAIMS

Claim 17, column 14, line 25, change "16" to --10--.

Column 6, line 54, after "scopes" insert --.--.

Column 6, line 62, change "2" to --320--.

Column 6, line 65, change "4" to --340--.

IN THE DRAWING

Substitute the attached sheet containing a revised Fig. 3a for the sheet containing the original Fig. 3a.

Signed and Sealed this

Twentieth Day of July, 1999

*Attest:*

Q. TODD DICKINSON

*Attesting Officer*         Acting Commissioner of Patents and Trademarks

Fig. 3a (prior art)

Fig. 3b (prior art)

UNITED STATES PATENT AND TRADEMARK OFFICE
CERTIFICATE OF CORRECTION

PATENT NO. : 5,754,147
DATED : May 19, 1998
INVENTOR(S) : Che-Chih Tsao, Zhen-Hong Zhou, Albert K. Hu It is certified that error appears in the above-identified patent and that said Letters Patent is hereby corrected as shown below:

Column 1,
After line 6, the following is inserted:
-- Statement of Government Interest
    This invention was made with United States Government Support under Contract DASG60-92-C-0113 awarded by the US Army Space & Missile Defense Command, CONTR & ACQ OFC/SMCD-CM-CK, PO Box 1500, Huntsville, AL 35807. The United States Government has certain rights in this invention. --

Signed and Sealed this

Second Day of April, 2002

*Attest:*

JAMES E. ROGAN
*Attesting Officer*     *Director of the United States Patent and Trademark Office*